United States Patent
Zhu

(10) Patent No.: US 9,478,116 B2
(45) Date of Patent: Oct. 25, 2016

(54) ELECTRONIC DEVICE WITH A WARNING FUNCTION AND METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Mao-Fang Zhu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/804,719

(22) Filed: Jul. 21, 2015

(65) Prior Publication Data

US 2016/0217673 A1 Jul. 28, 2016

(30) Foreign Application Priority Data

Jan. 23, 2015 (CN) .......................... 2015 1 0036861

(51) Int. Cl.
G08B 17/00 (2006.01)
G08B 21/18 (2006.01)
(52) U.S. Cl.
CPC .................................. G08B 21/182 (2013.01)

(58) Field of Classification Search
CPC .......................... G08B 21/00; G01R 19/16542
USPC ............ 340/588, 636.15, 657; 320/107, 108, 320/137
See application file for complete search history.

(56) References Cited

U.S. PATENT DOCUMENTS

| 2009/0128346 A1* | 5/2009 | Zhao | G08B 21/24 340/636.15 |
| 2014/0132851 A1* | 5/2014 | Cossairt | G02B 27/2214 349/7 |

\* cited by examiner

*Primary Examiner* — Tai Nguyen
(74) *Attorney, Agent, or Firm* — Zhigang Ma

(57) ABSTRACT

A method with a warning function includes: determining whether an electronic device is in a first preset state, wherein, the first preset state of the electronic device can be a state that the electronic device is being charged or a state in which the temperature of the electronic device is greater than a preset temperature; determining, when the electronic device is in the first preset state, whether the electronic device is contacted by a user via a sensing unit; controlling, when the electronic device is contacted by the user, a timer to record a contact duration; determining whether the contact duration recorded by the timer is greater than a first preset time; and controlling, when the contact duration is greater than the first preset time, a prompt unit to generate a warning signal.

17 Claims, 2 Drawing Sheets

ELECTRONIC DEVICE WITH A WARNING FUNCTION AND METHOD THEREOF

CROSS-REFERENCE TO RELATED APPLICATIONS

This application claims priority to Chinese Patent Application No. 201510036861.X filed on Jan. 23, 2015, the contents of which are incorporated by reference herein.

FIELD

The subject matter herein generally relates to the field of electronic products, and particularly to an electronic device with warning function and a method adapted for the electronic device.

BACKGROUND

Electronic devices, such as a mobile phone, a tablet computer, are more and more popular in daily life. However, an electronic device will overheat after being used for a long time, which can be uncomfortable for the user.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
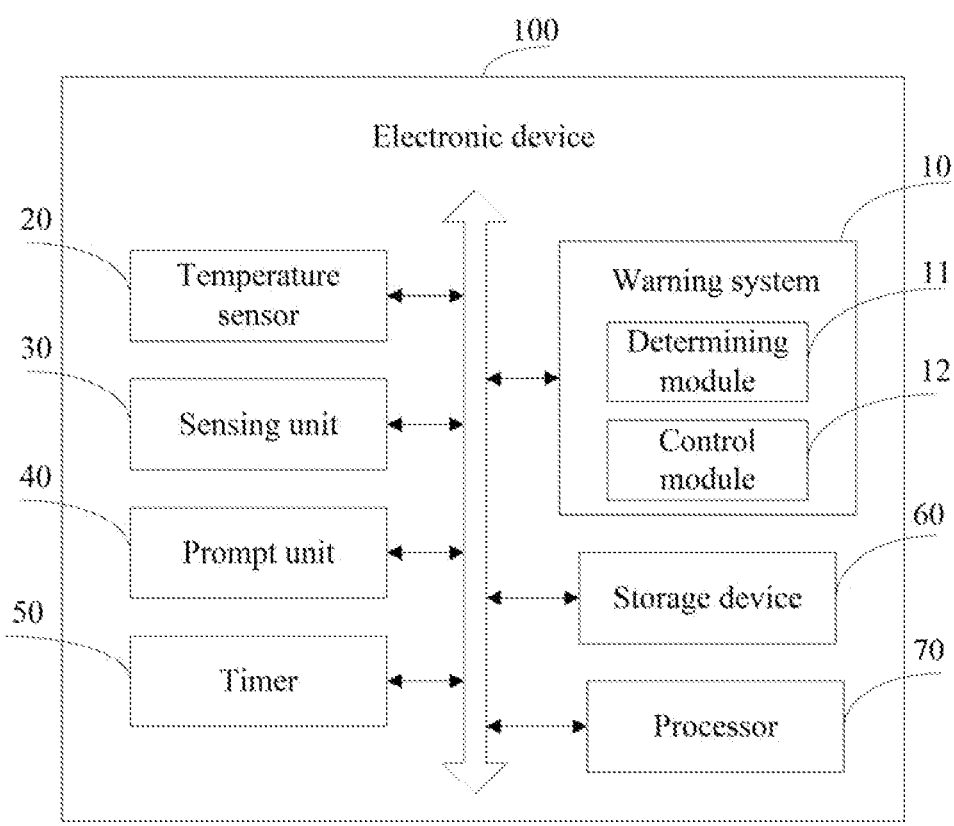
FIG. 1 is a block diagram of an example embodiment of an electronic device with a warning function.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device. The term "comprising" means "including, but not necessarily limited to"; it specifically indicates open-ended inclusion or membership in a so-described combination, group, series and the like.

FIG. 1 is a block diagram of an example embodiment of an electronic device 100 with a warning function. In at least one embodiment, a warning system 10 is installed and operable on the electronic device 100. The electronic device 100 can be a smart phone, a personal digital assistant (PDA), a tablet computer, or other electronic devices. The electronic device 100 further includes, but is not limited to, a temperature sensor 20, a sensing unit 30, a prompt unit 40, a timer 50, a storage device 60, and at least one processor 70. FIG. 1 illustrates only one example of the electronic device 100, other examples can include more or fewer components than illustrated, or have a different configuration of the various components in other embodiments.

The temperature sensor 20 is used to measure the temperature of the electronic device 100 itself. The sensing unit 30 is used to determine whether the electronic device 100 is contacted by a user. In the embodiment, the sensing unit 30 can be a capacitance sensor, a pressure sensor, a touch sensor, or other sensor configured to detect touch, contact, or proximity. The sensing unit 30 can be located at an appropriate position on the electronic device 100 as needed. The prompt unit 40 is used to produce a warning signal to remind the user to be careful while using the electronic device 100. The prompt unit 40 can be one or more of a speaker, a display screen, an indicating lamp, and a vibrator. The warning signal can be one or more of audio signals, light, or vibration. The timer 50 is used to record a contact duration that the user keeps contacting the electronic device 100 and/or a non contact duration that the user does not contact the electronic device 100. The contact duration is a period of time recorded by the timer 50 that the user keeps in contact with the electronic device 100. The non contact duration is another period of time recorded by the timer 50 that the user fails to keep in contact with the electronic device 100.

In at least one embodiment, the storage device 60 can include various types of non-transitory computer-readable storage mediums. For example, the storage device 60 can be an internal storage system, such as a flash memory, a random access memory (RAM) for temporary storage of information, and/or a read-only memory (ROM) for permanent storage of information. The storage device 60 can also be an external storage system, such as a hard disk, a storage card, or a data storage medium. The at least one processor 70 can be a central processing unit (CPU), a microprocessor, or other data processor chip that performs functions of the electronic device 100.

The warning system 10 determines whether the electronic device 100 is contacted by the user when the electronic device 100 is in a charging state or when a current temperature of the electronic device 100 is greater than a preset temperature, and records the contact duration via the timer 50 if the electronic device 100 is contacted by the user. The warning system 10 further controls the prompt unit 40 to provide a warning signal to remind the user to safely use the electronic device 100 when the recorded contact duration is greater than a first prompt time, thus, it is beneficial to avoid damage to the electronic device 100 due to prolonged use.

FIG. 1 illustrates in at least one embodiment, the warning system 10 can include a determining module 11 and a control module 12. One or more programs of the function modules can be stored in the storage device 60 and executed by the processor 70.

The determining module 11 determines whether the electronic device 100 is in a first preset state and determines whether the electronic device 100 is contacted by the user via the sensing unit 30 when the electronic device 100 is in the first preset state. "Contacted" in this embodiment means touched or held. Namely, the determining module 11 determines whether the electronic device 100 is touched or held by the user via the sensing unit 30 when the electronic device 100 is in the first preset state. In the embodiment, the first preset state of the electronic device 100 can be a state that the electronic device 100 is being charged or a state in which the temperature of the electronic device 100 is greater than a preset temperature.

In at least one embodiment, the determining module 11 determines whether the electronic device 100 is being charged and determines whether the electronic device 100 is in the first preset state when the electronic device 100 is being charged. If the determining module 11 determines the electronic device 100 is not being charged, the determining module 11 further acquires the temperature of the electronic device 100 measured by the temperature sensor 20 and determines whether the acquired temperature is greater than the preset temperature, and determines the electronic device 100 is in the first preset state when the acquired temperature is greater than the preset temperature. In the embodiment, the preset temperature is determined based on a sensitivity of skin of a user, such as 40 degrees centigrade, if the temperature of the electronic device 100 is greater than the preset temperature, the user contacting the electronic device 100 would feel uncomfortable.

The determining module 11 further determines whether the electronic device 100 is contacted by the user via the sensing unit 30 when the determining module 11 determines the electronic device 100 is in the first preset state, the control module 12 controls the timer 50 to record the contact duration and clear a non contact duration when the determining module 11 determines the electronic device 100 is contacted by the user. In the embodiment, the control module 12 controls the timer 50 to record the non contact duration when the determining module 11 determines that the electronic device 100 is not contacted by the user, the control module 12 controls the timer 50 to clear the recorded non contact duration when the determining module 11 determines that the electronic device 100 is contacted by the user.

The determining module 11 further determines whether the contact duration is greater than the first preset time when the electronic device 100 is contacted by the user. When the determining module 11 determines the contact duration is greater than the first preset time, the control module 12 controls the prompt unit 40 to generate a warning signal to remind the user to be careful while using the electronic device 100. In the embodiment, the first preset time can be set by the user according to need or can be a default value.

In the present embodiment, the determining module 11 further determines whether the electronic device 100 is in the first preset state and is contacted by the user after a second preset time since the control module 12 controls the prompt unit 40 to generate the warning signal. The control module 12 can discontinue or pause the charging of the electronic device 100 when the determining module 11 determines the electronic device 100 is in the first preset state and is contacted by the user after the second preset time.

In some embodiments, when the electronic device 100 is running applications which would cause the temperature of the electronic device 100 to be enhanced greatly, such as a game software, or a video player software, and when the determining module 11 determines the electronic device 100 is in the first preset state and is contacted by the user after a second preset time, the control module 12 only controls the corresponding applications to close.

In one embodiment, when the determining module 11 determines the electronic device 100 is in the first preset state and is not contacted by the user, the control module 12 controls the timer 50 to record the non contact duration.

In one embodiment, the determining module 11 further determines whether the non contact duration recorded by the timer 50 is greater than a third preset time, the control module 12 clears the contact duration when the determining module 11 determines the non contact duration is greater than the third preset time. In the embodiment, the third preset time is five minutes.

Figure 2:
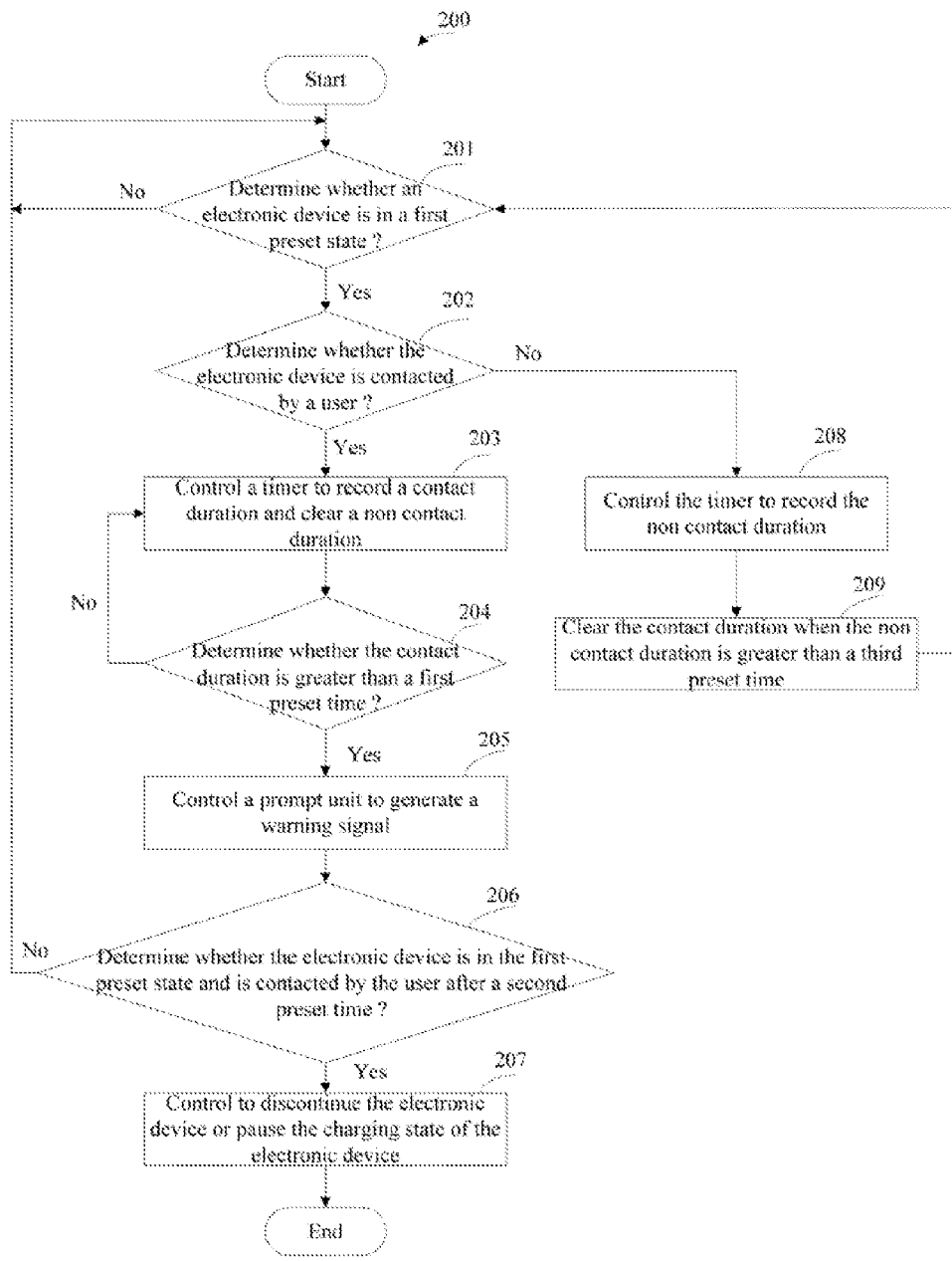
FIG. 2 is a flowchart of an example embodiment of a method with a warning function.

FIG. 2 illustrates a flowchart is presented in accordance with an example embodiment. An example method 200 is provided by way of example, as there are a variety of ways to carry out the method. The example method 200 described below can be carried out using the configurations illustrated in FIG. 1, and various elements of these figures are referenced in explaining the example method. Each block shown in FIG. 2 represents one or more processes, methods, or subroutines, carried out in the example method 200. Furthermore, the illustrated order of blocks is illustrative only and the order of the blocks can be changed according to the present disclosure. The example method 200 can begin at block 201. Depending on the embodiment, additional blocks can be utilized and the ordering of the blocks can be changed.

At block 201, a determining module determines whether an electronic device is in a first preset state. In the embodiment, the first preset state of the electronic device can be a state that the electronic device is being charged or a state in which the temperature of the electronic device is greater than a preset temperature. If the electronic device is in the first preset state, the process goes to block 202, otherwise, the process returns to block 201.

In at least one embodiment, the determining module determines whether the electronic device is being charged and determines whether the electronic device is in the first preset state when the electronic device is being charged. If the determining module determines the electronic device is not being charged, the determining module further acquires the temperature of the electronic device measured by a temperature sensor and determines whether the acquired temperature is greater than the preset temperature. The determining module further determines the electronic device is in the first preset state when the temperature acquired by the determining module is greater than the preset temperature. In the embodiment, the preset temperature is determined based on a sensitivity of skin of a user, such as 40 degrees centigrade.

At block 202, the determining module further determines whether the electronic device is contacted by the user via a sensing unit when the determining module determines the electronic device is in the first preset state. If the electronic device is contacted by the user, the process goes to block 203, otherwise, the process goes to block 208.

At block 203, a control module controls a timer to record a contact duration and clear a non contact duration when the determining module determines the electronic device is contacted by the user. In the embodiment, the control module controls the timer to record the non contact duration when the determining module determines that the electronic device is not contacted by the user, the control module controls the timer to clear the recorded non contact duration when the determining module determines that the electronic device is contacted by the user.

At block 204, the determining module further determines whether the contact duration is greater than a first preset time. If the contact duration is greater than the first preset time, the process goes to block 205, otherwise, the process goes to block 203.

At block 205, the control module controls a prompt unit to generate a warning signal to remind the user to be careful while using the electronic device when the determining module determines the contact duration is greater than the first preset time. In the embodiment, the first preset time can be set by the user according to need or can be a default value. The prompt unit can be one or more of a speaker, a display screen, an indicating lamp, and a vibrator. The warning signal can be one or more of audio signals, light, or vibration.

At block 206, the determining module further determines whether the electronic device is in the first preset state and is contacted by the user after a second preset time since the control module controls the prompt unit to generate the warning signal. If the electronic device is in the first preset state and is contacted by the user after the second preset time, the process goes to block 207, otherwise, the process goes to block 201.

At block 207, the control module discontinues the electronic device or pauses the charging of the electronic device when the determining module determines the electronic device is in the first preset state and is contacted by the user after the second preset time. In some embodiments, when the electronic device is running some applications which would cause the temperature of the electronic device to be enhanced greatly, such as a game software, or a video player software, and when the determining module determines the electronic device is in the first preset state and is contacted by the user after the second preset time, the control module only controls the corresponding applications to close.

At block 208, the control module controls the timer to record the non contact duration when the determining module determines that the electronic device is not contacted by the user.

At block 209, the control module further clears the contact duration recorded by the timer when the determining module 11 determines the non contact duration is greater than a third preset time.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
    a temperature sensor configured to measure a temperature of the electronic device;
    a sensing unit configured to determine whether the electronic device is contacted by a user;
    a prompt unit configured to produce a warning signal to remind the user;
    a timer configured to record a contact duration and a non contact duration; and
    at least one processor configured to execute instructions comprising:
        determining whether the electronic device is in a first preset state, wherein, the first preset state of the electronic device can be a state that the electronic device is being charged or a state in which the temperature of the electronic device is greater than a preset temperature;
        determining, when the electronic device is in the first preset state, whether the electronic device is contacted by the user via the sensing unit;
        controlling, when the electronic device is contacted by the user, the timer to record the contact duration;
        determining whether the contact duration recorded by the timer is greater than a first preset time; and
        controlling, when the contact duration is greater than the first present time, the prompt unit to generate the warning signal.

2. The electronic device as recited in claim 1, wherein the at least one processor further configured to execute comprising:
    determining whether the electronic device is in the first preset state and is contacted by the user after a second preset time, and discontinuing the electronic device or pausing the charging of the electronic device when the electronic device is in the first preset state and is contacted by the user after the second preset time.

3. The electronic device as recited in claim 1, the processor further configured to execute comprising:
    controlling the timer to record the non contact duration when the electronic device is not contacted by the user.

4. The electronic device as recited in claim 3, wherein the at least one processor further configured to execute comprising:
    controlling the timer to clear the contact duration when the non contact duration is greater than a third preset time.

5. The electronic device as recited in claim 1, wherein the at least one processor further configured to execute comprising:
    controlling the timer to clear the non contact duration when the electronic device is contacted by the user.

6. The electronic device as recited in claim 1, the sensing unit can be a pressure sensor or a touch sensor.

7. The electronic device as recited in claim 1, the warning signal can be one or more of audio signals, light, or vibration.

8. A warning method comprising:
    determining whether an electronic device is in a first preset state, wherein, the first preset state of the electronic device can be a state that the electronic device is being charged or a state in which the temperature of the electronic device is greater than a preset temperature;
    determining, when the electronic device is in the first preset state, whether the electronic device is contacted by a user via a sensing unit;
    controlling, when the electronic device is contacted by the user, a timer to record a contact duration;
    determining whether the contact duration recorded by the timer is greater than a first preset time; and
    controlling, when the contact duration is greater than the first preset time, a prompt unit to generate a warning signal.

9. The method as recited in claim 8, further comprising:
determining whether the electronic device is in the first preset state and is contacted by the user after a second preset time; and
discontinuing the electronic device or pausing the charging of the electronic device when the electronic device is in the first preset state and is contacted by the user after the second preset time.

10. The method as recited in claim 8, further comprising:
controlling the timer to record a non contact duration when the electronic device is not contacted by the user.

11. The method as recited in claim 10, further comprising:
controlling the timer to clear the contact duration when the non contact duration is greater than a third preset time.

12. The method as recited in claim 10, further comprising:
controlling the timer to clear the non contact duration when the electronic device is contacted by the user.

13. A non-transitory storage medium having stored thereon instructions that, when executed by at least one processor of an electronic device, causes the at least one processor to execute instructions of a method with warning function, the method comprising:
determining whether the electronic device is in a first preset state, wherein, the first preset state of the electronic device can be a state that the electronic device is being charged or a state in which a temperature of the electronic device is greater than a preset temperature;
determining, when the electronic device is in the first preset state, whether the electronic device is contacted by a user via a sensing unit;
controlling, when the electronic device is contacted by the user, a timer to record a contact duration;
determining whether the contact duration recorded by the timer is greater than a first preset time; and
controlling a prompt unit to generate a warning signal when the contact duration is greater than the first preset time.

14. The non-transitory storage medium as recited in claim 13, wherein the method is further comprising:
determining whether the electronic device is in the first preset state and is contacted by the user after a second preset time; and
discontinuing the electronic device or pausing the charging of the electronic device when the electronic device is in the first preset state and is contacted by the user after the second preset time.

15. The non-transitory storage medium as recited in claim 13, wherein the method is further comprising:
controlling the timer to record a non contact duration when the electronic device is not contacted by the user.

16. The non-transitory storage medium as recited in claim 15, wherein the method is further comprising:
controlling the timer to clear the contact duration when the non contact duration is greater than a third preset time.

17. The non-transitory storage medium as recited in claim 15, wherein the method is further comprising:
controlling the timer to clear the non contact duration when the electronic device is contacted by the user.

* * * * *